(12) United States Patent
Ma (10) Patent No.: US 6,215,264 B1
(45) Date of Patent: Apr. 10, 2001

(54) POWER-DRIVEN DISC STORAGE CASE

(75) Inventor: Yong Xing Ma, Hong Kong (CN)

(73) Assignee: Well Mark International Ltd. (HK)

( * ) Notice: Subject to any disclaimer, the term of this patent is extended or adjusted under 35 U.S.C. 154(b) by 0 days.

(21) Appl. No.: 09/411,719

(22) Filed: Jan. 21, 1999

Related U.S. Application Data (63) Continuation-in-part of application No. PCT/CN98/00076, filed on May 21, 1998.

(30) Foreign Application Priority Data

May 21, 1997 (CN) .................................................. 97112087

(51) Int. Cl.$^7$ ...................................................... B65D 85/57
(52) U.S. Cl. ........................ 318/293; 211/40; 211/41.12; 206/308.1; 312/9.9
(58) Field of Search ..................................... 318/256, 280, 318/283, 286, 287, 291, 293, 466, 558; 211/1.51, 1.52, 1.55, 1.56, 40, 41.1, 41.12; 206/307, 308.1; 312/9.1, 9.9, 9.45, 9.64; 414/754, 777; 369/36, 37, 38; 360/73.03, 97.01

(56) References Cited

U.S. PATENT DOCUMENTS 3,967,828 * 7/1976 Topolski .............................. 274/10 D
5,022,019 * 6/1991 Motoyoshi et al. .................... 369/36
5,088,604 * 2/1992 Baur et al. ............................. 211/1.5
5,267,225   11/1993 Fukawasa et al. .
5,373,489 * 12/1994 Sato et al. ............................... 369/36
5,613,745    3/1997 Cho et al. .
5,757,594 *  5/1998 Dang et al. ........................... 360/191
5,764,615 *  6/1998 Ware et al. ........................... 369/178

FOREIGN PATENT DOCUMENTS 3-351-221    1/1990 (EP) .

* cited by examiner

Primary Examiner—Bentsu Ro
(74) Attorney, Agent, or Firm—Wallenstein & Wagner, Ltd.

(57) ABSTRACT

A power-driven disc storage case comprising an outer casing, a chassis, a rolling top, a plurality of disc brackets, two button switches, a micro high-speed D.C. motor, a transmission with safety protect mechanism, a main switch, and two lamps. Two discs are vertically provided on each of the disc brackets. A rolling top is opened and then the lamps installed inside are turned on so as to illuminate the disc at the front opening. The user can select a disc, press down the button switches (left or right) if it is not the target disc to be chosen by the user. The motor then drives the chain of the brackets to move the discs either left or right. The user does not release the push-button switch until a disc needed has moved to the front opening and takes out the disc.

11 Claims, 8 Drawing Sheets

FIG. 1

Prior Art

POWER-DRIVEN DISC STORAGE CASE

This Appln is a C-I-P of PCT/CN98/00076 filed May 21, 1998.

DESCRIPTION

TECHNICAL FIELD

The present invention relates to a disc storage case, and particularly to a power-driven disc storage case.

BACKGROUND OF THE INVENTION

A general disc storage case or cabinet is used to arrange covered discs in a disc storage case, with the discs numbered and labeled on the cover, in order to distinguish and drawn them out for use. Typically, during selection, it is necessary to find the shelves one by one for the required disc, and after pulling the disc out, the cover must be removed before use.

SUMMARY OF THE INVENTION

It is an object of the present invention to provide a power-driven disc storage case for holding discs.

It is a further object of the present invention to provide a serious of cases piled up by a number of power-driven disc storage cases.

The power-driven disc storage case of the present invention comprises an outer casing, a chassis, a rolling top, two drawers, a face plate, two button switches located on both the left and right side of the front face plate, two lamps on the back of the face plate, an outer socket for connecting DC power supply at the back of the storage case and an electric cell chamber under the chassis, a power-driven selective conveyor located on the chassis which involves a plurality of disc brackets, each of which having two arc-shaped grooves for holding vertically two discs which are placed back-to-back so that the contents printed on the disc can be easily read. The chassis further includes a contact main switch, which can be stricken by the rolling top while it is open to connect the power supply, causing the lamps to light and illuminate the discs on the brackets in the front opening of the storage case; a micro high-speed DC motor which can rotate towards one direction to make the bracket of the disc move clockwise when the left button switch being pressed and can rotate towards another direction to make the bracket of the disc move counterclockwise when the right button switch is pressed; a transmission with safety protective mechanism, which can be driven by the micro high-speed DC motor to have the bracket of the disc move while any one of the two button switches are pressed continuously, and is stoppable by releasing the button switch when the desired disc is forwarded to the front position.

In connection with the disc storage case of the present invention, the transmission consists of a plurality of transmission gears and a transmission chain, such gears make up an underdrive gear set that reduces the rotation rate of a high-speed D.C. motors to an adequate driving speed of the transmission chain, on which a plurality of brackets for the discs are installed.

The disc storage case of the present invention, wherein the safety protective mechanism of the transmission comprises a belt, speed reducer and chain belt, the belt as first-stage belt functioning for vibration-resistance noise elimination and overload protection.

The disc storage case of the present invention comprising a plurality of brackets for discs from 12 to 60.

A series of the disc storage case of the present invention, comprising a plurality of the disc storage cases and a plurality of fixing accessories, by which a plurality of such cases can be piled up and fixed to act as a series of the disc storage case.

An advantage of the disc storage case with power-driven selective shelf of the present invention is that it can hold many kinds of discs; for example, CD, CD-ROM and VCD. If another kind of disc bracket with somewhat different dimension is used, it can also hold DVD and floppy disc.

A further advantage of the present invention is that the disc storage case has a hand-pushed rolling top with convenient operation, rustproof and artistic appearance.

A further advantage of the present invention is that the disc storage case is compact and exquisite, while 100 uncovered discs can be held in a disc storage case of 44 cm×26 cm×16 cm only. The description for the discs, such as words of a song, etc., can be put in a small drawer thereon.

A further advantage of the present invention is that, after the rolling top of the disc storage case is opened, the lamp therein lights at once and shines on the disc in the front of the case. Gently pressing the shift button of any one of both sides, the bracket will be transferred and will not stop until the button is released while the disc needed moves to the front. The user can take out the disc with ease after the disc stops at the position of the opening of the rolling top.

A still further advantage of the present invention is that, when the number of discs is more than 100, then several disc storage cases may be piled up and fixed with fixing accessories to a series of disc storage cases for saving space and having splendid style.

Another advantage of the present invention is that the transmissions in the disc storage case are equipped with safety protective mechanism, which can prevent motor damage due to overload and caused by obstruction or improper application in the process of operation.

Another advantage of the present invention is that the rear of the storage case has an outer connection DC electric supply socket.

A low-voltage output (for example, 3 volts) plug of AC-DC adaptor may be connected, so the common AC supply can be used instead of using cells power.

BRIEF DESCRIPTION OF THE DRAWINGS

The present invention will become more apparent as the disclosure of the present invention is made with reference to the accompanying drawings.

DETAILED DESCRIPTION OF THE PREFERRED EMBODIMENT

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1:
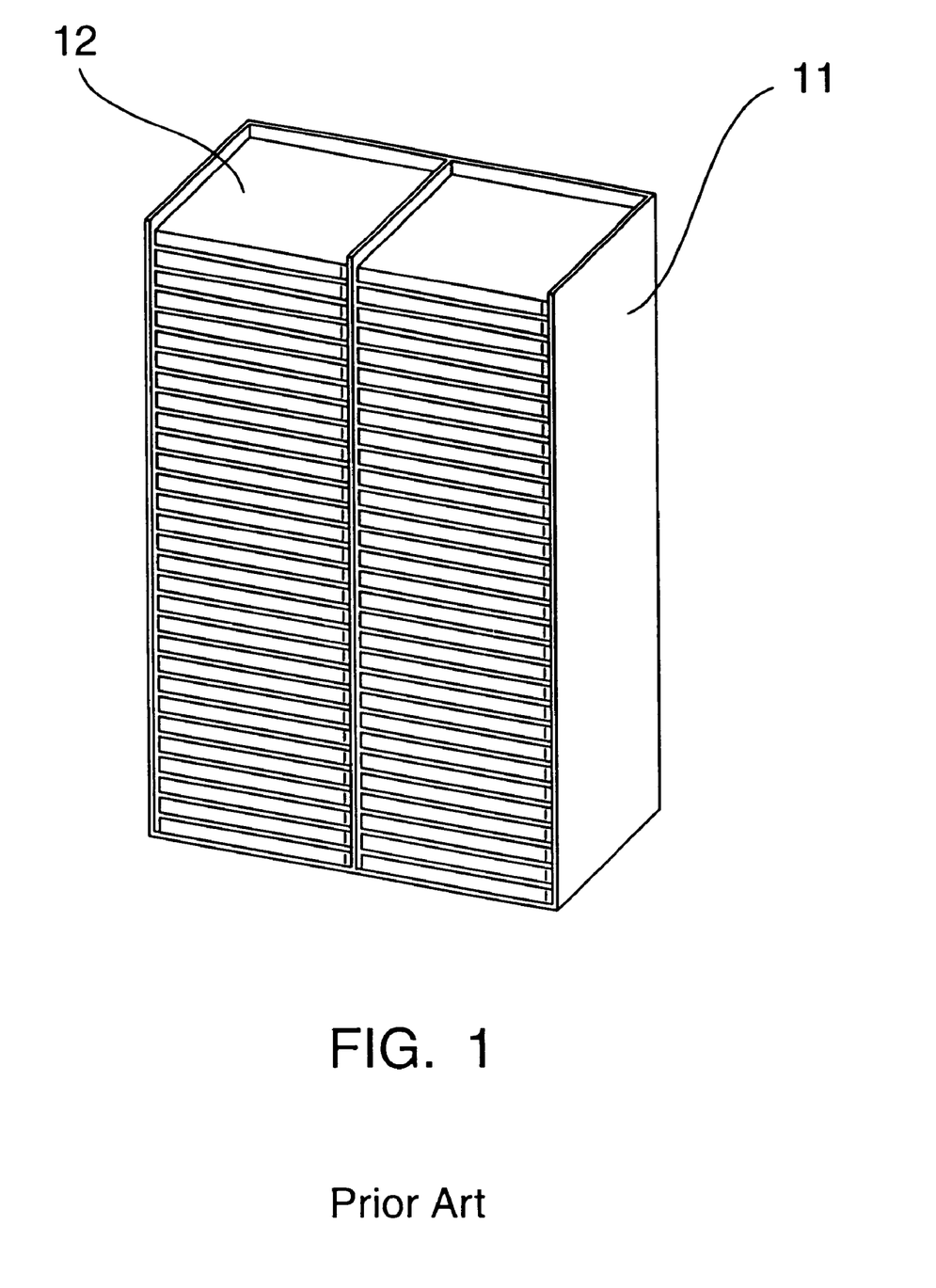
FIG. 1 is a view of the prior art disc storage case.

FIG. 1 is a view of the disc storage case (cabinet) of the prior art, wherein 11 is an outer casing of the case (cabinet), and 12 is a covered disc. The shortcoming of this disc storage case is that, when selecting discs, it is necessary to check the holding list first, then take out the disc needed from the corresponding shelf. This is inconvenient for use.

Figure 2:
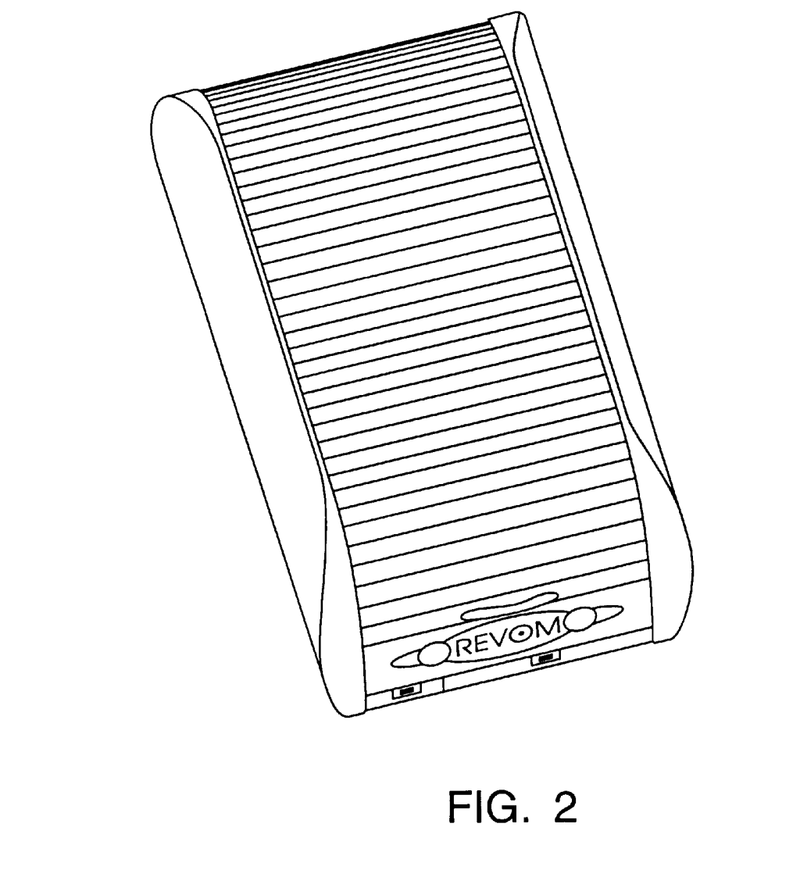
FIG. 2 is an exterior view of the power-driven disc storage case of the present invention, wherein the rolling curtain door is closed.
Figure 3:
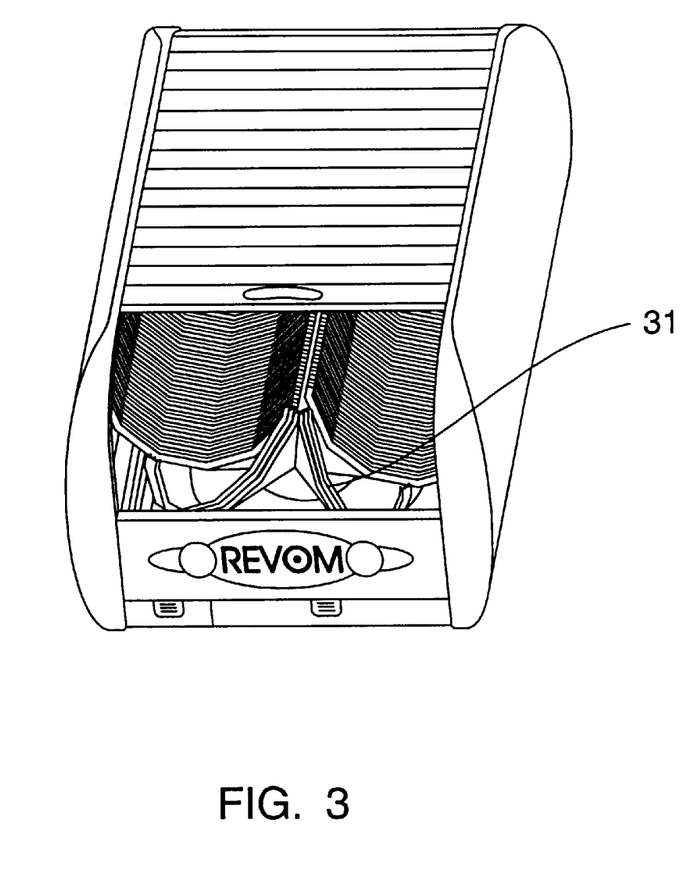
FIG. 3 is an exterior view of the power-driven disc storage case of the present invention, wherein the rolling curtain door is opened.

FIG. 2 is an exterior view of the power-driven disc storage case 10 of the present invention. FIG. 3 is as exterior view of the disc storage case 10, wherein the rolling top 20 is opened. From the Figure, the arrangement for part of brackets 31 for discs can be seen when no discs are put in, and the number of brackets 31 for discs are at least twelve. In the present embodiment, the brackets 31 can total fifty, and each bracket can hold vertically two discs; therefore, one hundred discs can be put into the disc storage case 10.

Figure 4:
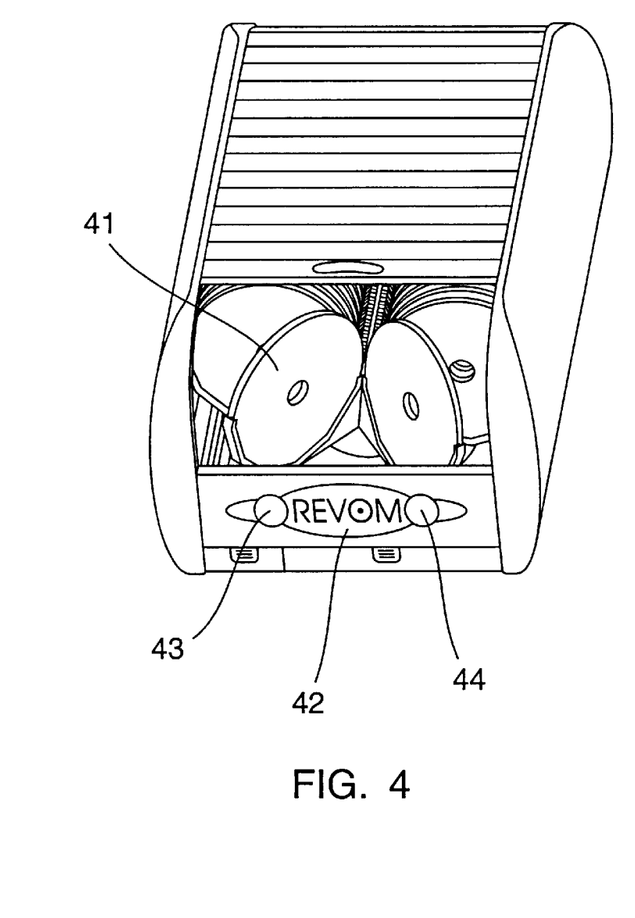
FIG. 4 is a schematic drawing of the disc storage case of the present invention, as shown in FIG. 3 when it is full of discs.

FIG. 4 is an exterior view of the disc storage case 10 as shown in FIG. 3, when it is full of discs. In the Figure, a reference number 41 indicates an uncovered disc, a reference number 42 indicates trademark label, and reference numerals 43 and 44 indicate left and right buttons provided on both ends of the front plate of the case, respectively.

Figure 5:
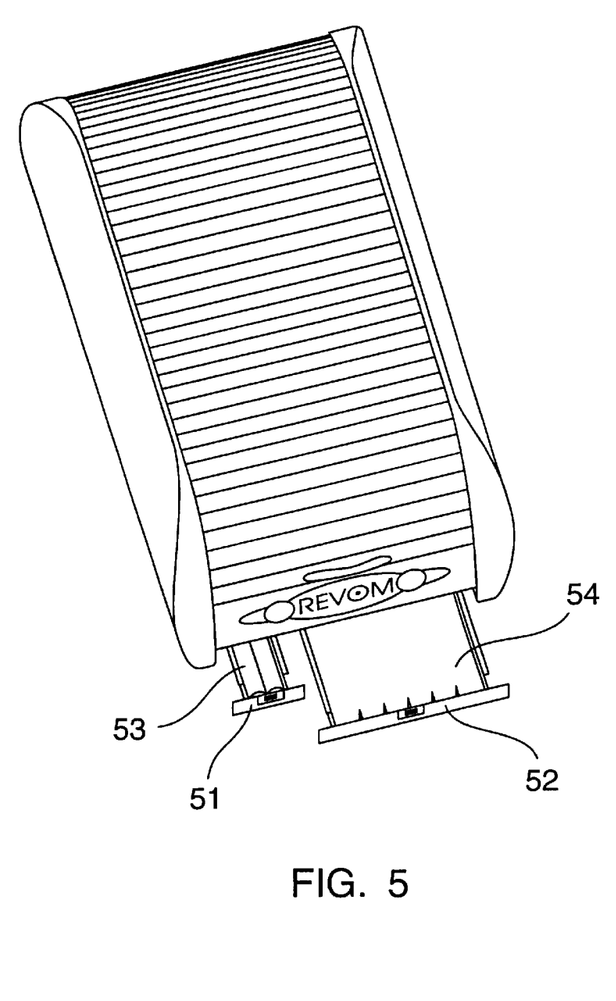
FIG. 5 is a schematic drawing of the disc storage case of the present invention, as shown in FIG. 2, of which the two drawers are pulled out.

FIG. 5 is a schematic drawing of the disc storage case 10 of the present invention, as shown in FIG. 2, in which the two drawers are pulled out. In the Figure, reference numbers 51, 52 indicate left and right drawers, respectively. Two 1.5 volt AA cells 53 can be put in the left drawer 51, so as to provide the DC power supply for the lamps and high-speed DC motor 74 in the disc storage case 10. An outer connection supply jack (not shown) is provided on the rear plate of the disc storage case, when the DC 3 volts output plug of the AC-DC adaptor (sold in the market) being inserted into the jack, it can cut off the power supply of the inside cells. The power is then supplied from outside. Right drawer 52 accommodates the description for holding discs, for example, words of a song 54.

Figure 6:
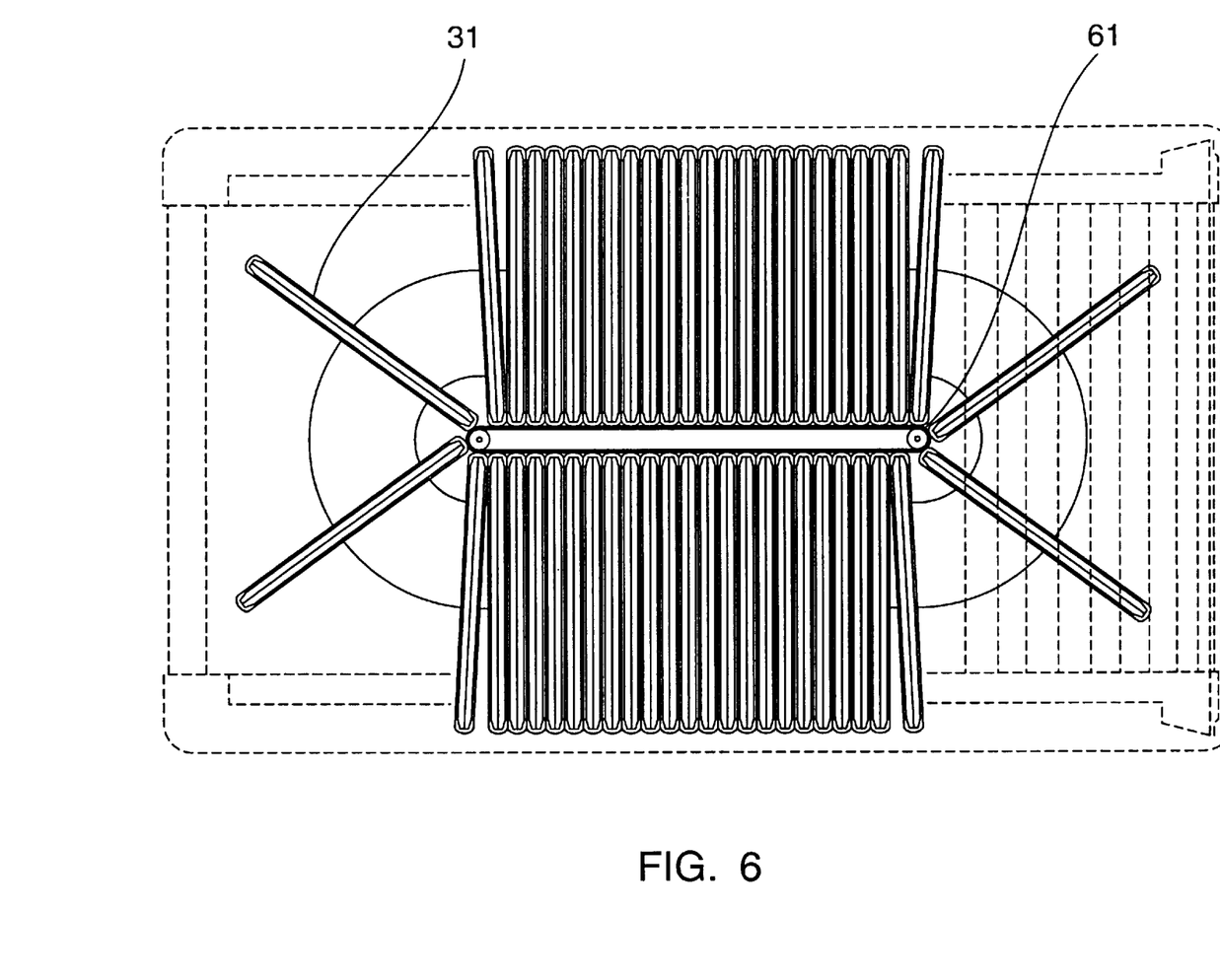
FIG. 6 is a bottom view of the disc storage case of the present invention, wherein the rolling curtain door and outer casing are removed.

FIG. 6 is a bottom view of the disc storage case 10 of the present invention, which the rolling top and outer casing are removed. Note that the left-end of FIG. 6 is the front of the disc storage case, as shown in FIG. 2, and the lower end is the right of the disc storage case, as shown in FIG. 2. In this Figure, a reference numeral 61 indicates a transmission chain. One end of each bracket 31 of disc is connected to the transmission chain 61, which is driven by gears 72 of the transmission, to make all fifty brackets 31 of discs move in turn.

Figure 7A:
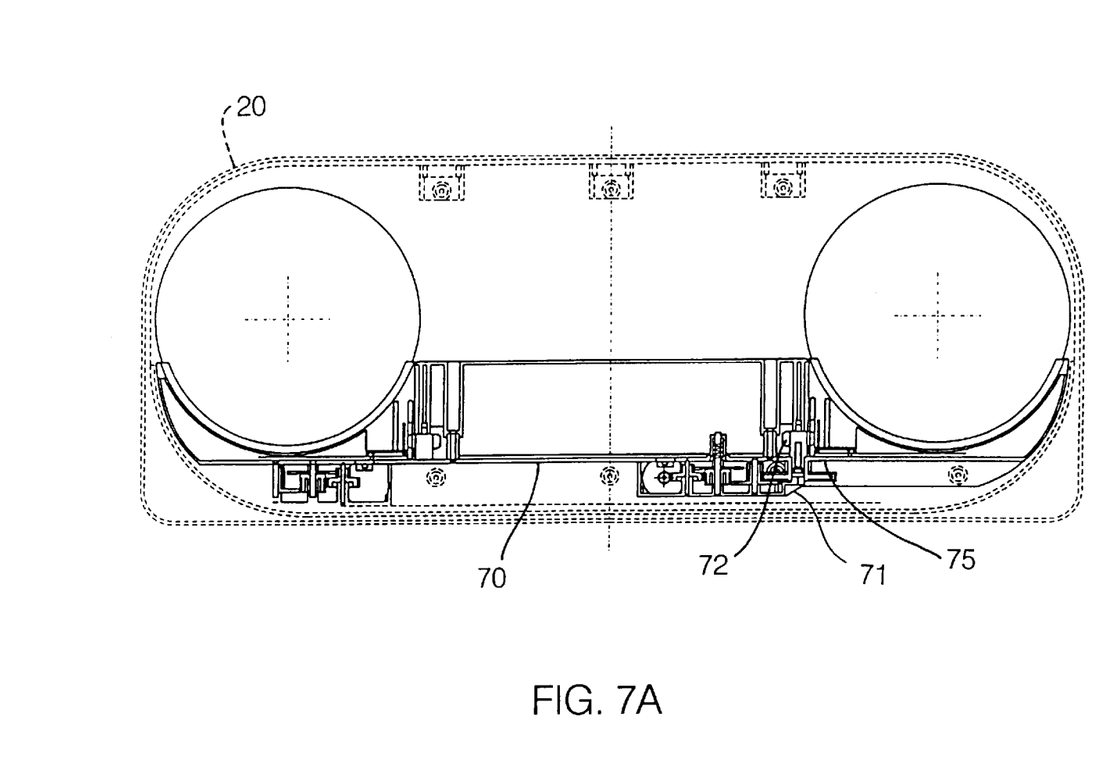
FIG. 7A is a side sectional view of the disc storage case of the present invention, wherein the rolling top and outer casing are removed, illustrating the chassis.

FIG. 7A is a side sectional view of the disc storage case of the present invention, wherein the rolling top 20 and outer casing are removed. Further illustrated is the chassis 70, and its following components: a contact main switch, which can be stricken by the rolling top 20 while it is open to connect the power supply, causing the lamps to light and illuminate the discs on the brackets 31 in the front opening of the storage case; a micro high-speed DC motor 74 which can rotate towards one direction to make the bracket of the disc move clockwise when the left button switch 43 being pressed and can rotate towards another direction to make the bracket 31 of the disc move counterclockwise when the right button switch 44 is pressed; a transmission 71 with safety protective mechanism, which can be driven by the micro high-speed DC motor 74 to have the bracket 31 of the disc move while any one of the two button switches are pressed continuously, and is stoppable by releasing the button switch when the desired disc is forwarded to the front position.

Figure 7B:
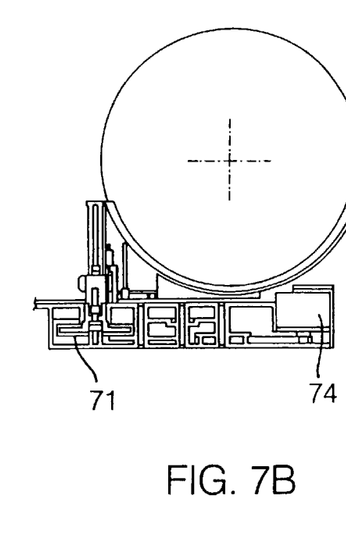
FIG. 7B is a cross-sectional view along line k—k of FIG. 7A.
Figure 8:
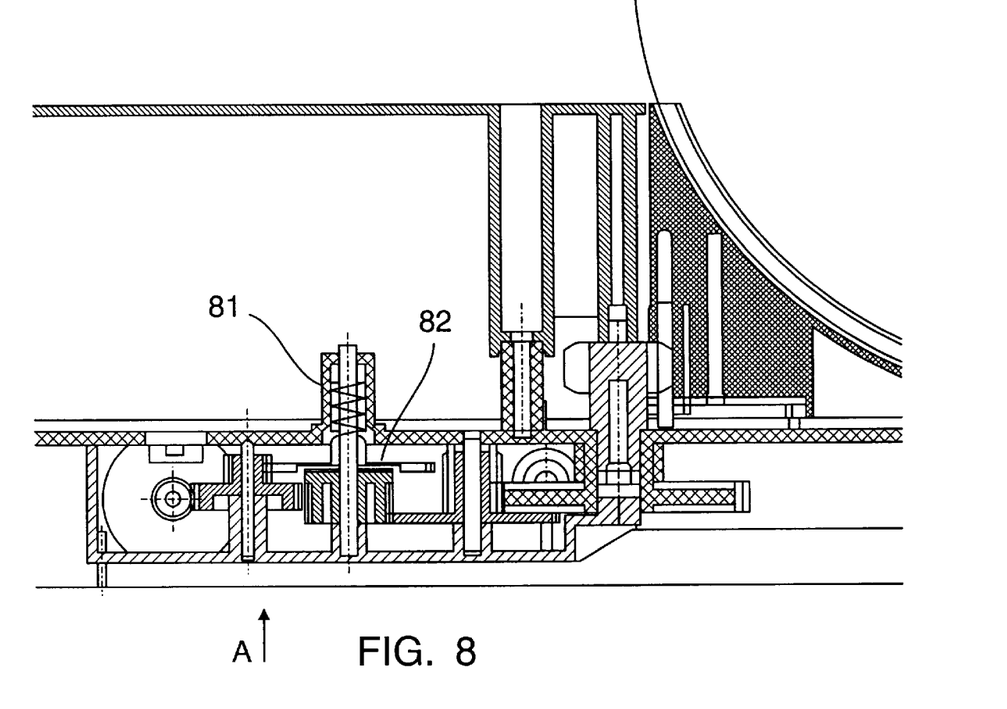
FIG. 8 is an enlarged scheme of the high-speed DC motor and the transmission with safety protective mechanism of the present invention as shown in FIG. 7B.

FIG. 8 is an enlarged scheme of the transmission with safety protective mechanism, as shown in FIG. 7B, which is driven by the high-speed DC motor 74. In the Figure, a reference number 81 indicates CD brackets, 82 indicates pipe column, 83 indicates driving belt, wherein the elasticity and sliding friction of the belt has the function of vibration resistance, noise elimination and overload protection.

Figure 9:
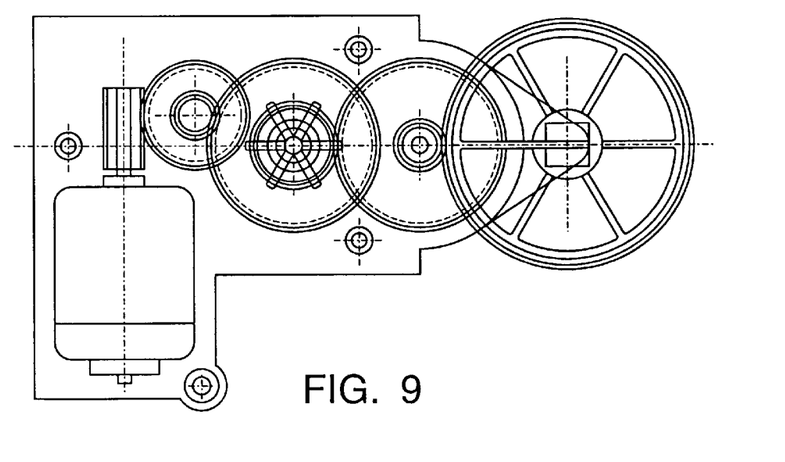
FIG. 9 is a sectional view taken along line A—A of FIG. 8.

FIG. 9 is a section view taken along line A—A of FIG. 8. As it is clearly shown, when the high-speed DC motor 74 rotates, it can driven the speed reducer and then drives the transmission chain 71 to move the brackets of discs, in turn. The CD bracket is connected by shaft and is fixed by bolt, the pipe column 82 serves to locate and lead the belt, as first-stage belt 83 has the function of vibration resistance, noise elimination and overload protection.

Figure 10:
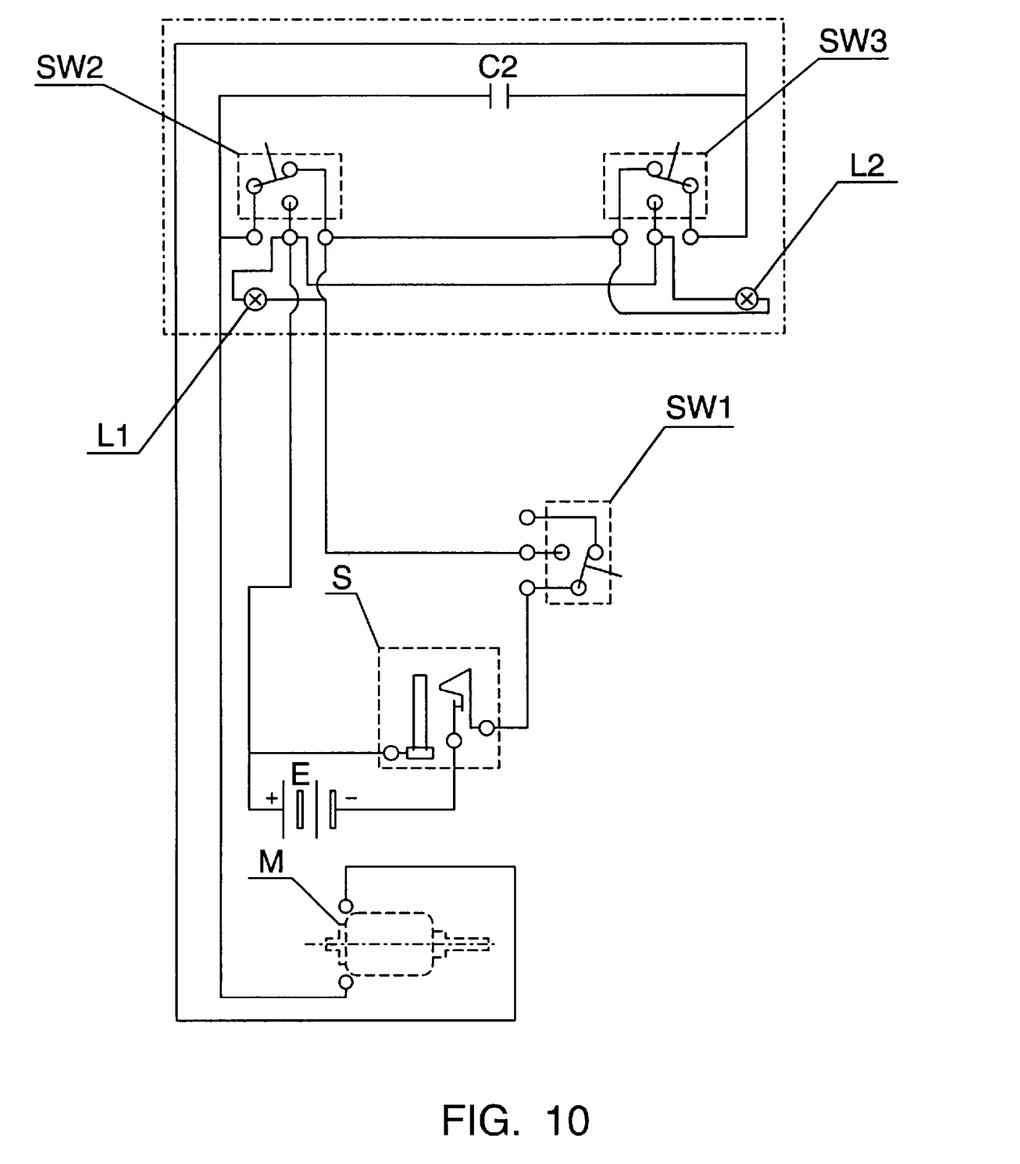
FIG. 10 is a diagram of the circuits of the disc storage case of the present invention; and, FIG. 11 is a perspective view of a series of the disc storage cases of the present invention.

FIG. 10 is a scheme of circuits of the disc storage cases of the present invention. SW1 in this diagram is a contact switch. When the rolling top 20 is opened completely, the contact switch SW1 is closed and connects the 3 volt DC power supply E (two 1.5 volt AA cells), the lamps L1 and L2 light. At this time, the user can press the left or right button switches 43 or 44 (FIG. 4) provided on the front plate of disc storage case to make high-speed DC motor M rotated in normal or reserve directions, i.e., to move brackets of discs clockwise or counterclockwise; when the button switch is loosened, the brackets of discs will stop moving. In this diagram, S is outer DC supply socket, when DC 3 volt output plug of AC-DC adaptor is inserted into socket S, the cell power supply E is cut-off automatically, and power is supplied by AC-DC adaptor via urban electricity. The advantage of this circuit is that when the left and right button switches 43, 44 are pressed at the same time, the DC motor M cannot rotate. In addition, the power supply is cut-off after the rolling curtain door is closed, even if any one of the button switches 43, 44 is accidentally pressed, therefore, the motor will not rotate. In the diagram, the specifications of the whole spare parts are as follows: the switches SW1, 43 and 44 are all 1 Amp 125 volts, M is RF-330T-16170, S is DC 3 volts, 1 Amp, C is 22 micro-farad/10 volts, R is 4.7 Ohm.

Figure 11:
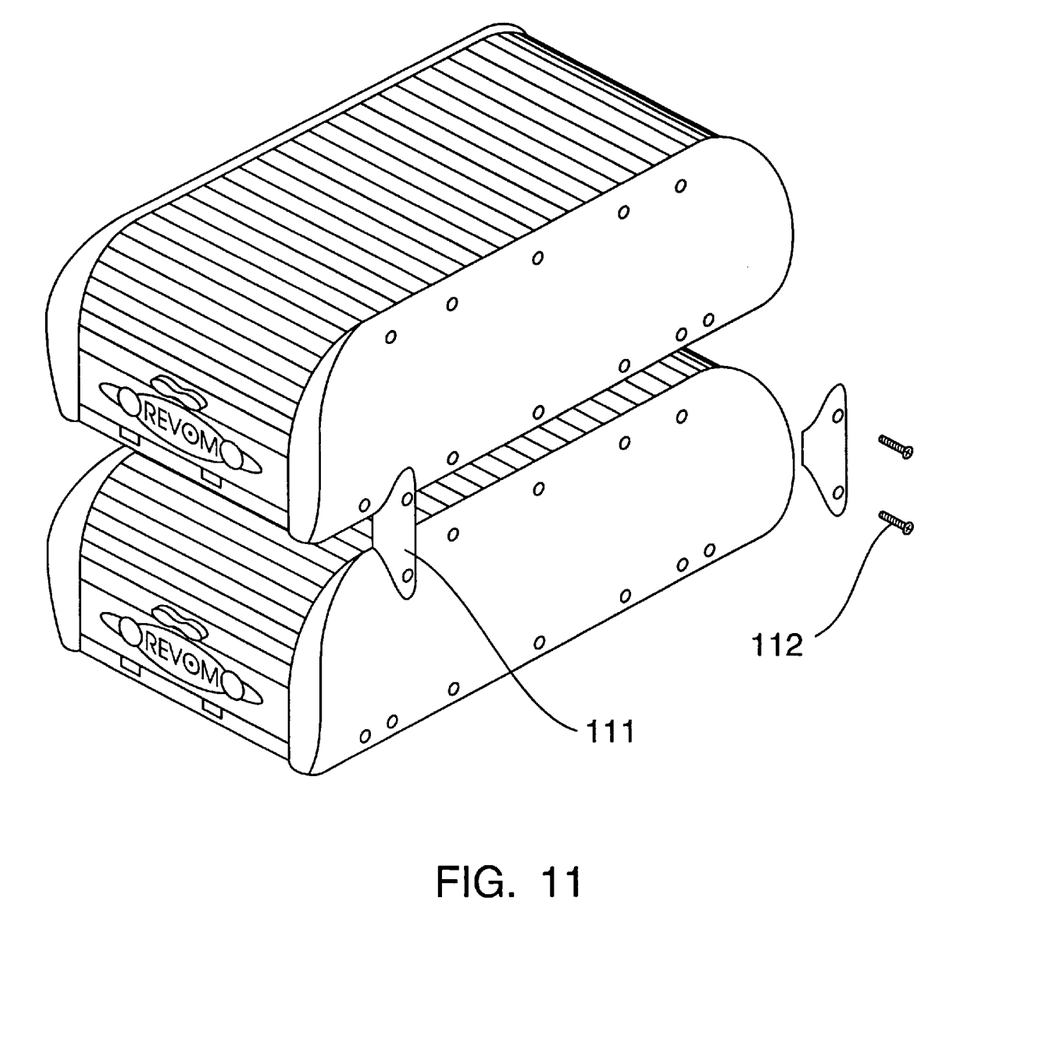

FIG. 11 is a perspective view of a series of the disc storage cases of the present invention. A plurality of the disc storage cases of the present invention can be piled up via the connecting support 111 and can be fastened with the connecting support 111 by inserting screws 112. This scheme shows the piled state of two disc storage cases, and it can be understood that more than three disc storage cases can also be piled in the same manner.

The disc storage cases of the present invention not only can hold discs with various dimensions and different specifications, for example, CD, CD-ROM and VCD, but also has hand-operated rolling top, inside illumination lamps and safety protective mechanism, and is convenient for operation, rustproof, artistic, small and exquisite.

To sum up, the disc storage case and case series of the present invention have a novel structure, is rich in creation, with good effect of application and practical value.

While the specific embodiments have been illustrated and described, numerous modifications come to mind without significantly departing from the spirit of the invention and the scope of protection is only limited by the scope of the accompanying claims.

What is claimed is:

1. A power-driven disc storage case which can move a target discs to its front opening by operating power-driven buttons thereon or inputting serial number by LCD to proceed automatic search, comprising an outer casing, a chassis, a rolling top, two drawers, a face plate, a left button switch and a right button switch located on both left and right sides of the front face plate, two lamps on the back of the face plate, an outer socket for connecting DC power supply at back of the storage case and an electric cell chamber under the chassis, a power-driven selective conveyor located on the chassis which comprises a plurality of disc brackets, each having two arc-shaped grooves for holding vertically two discs back-to-back so that the contents printed on the disc can be read easily, the chassis further comprising:

a contact main switch which can be stricken by the rolling top while it is open to connect the power supply, causing the lamps to light and illuminate the discs on the brackets in the front opening of the storage case;

a micro high-speed DC motor, which can rotate towards one direction to make the bracket of the disc move clockwise when the left button switch is pressed and can rotate towards another direction to make the bracket of the disc move counterclockwise when the right button switch is pressed;

a transmission with safety protective mechanism which can be driven by the micro high-speed DC motor to have the bracket of the disc moved while any one of the two button switches is pressed continuously, and stop by releasing the button switch when the disc needed is forwarded to the front position.

2. The disc storage case according to claim 1, wherein the plurality of brackets having arc-shaped grooves can be used for holding the discs by inserting the edge of the disc with non-recorded digital signal into the arc-shaped grooves.

3. The disc storage case according to claim 2 further including a movement track of the brackets for discs arranged in a linear section and fanned out at the front opening for convenience of a user to search the target disc for removal.

4. The disc storage case according to claim 1, wherein the transmission comprises a plurality of transmission gears and a transmission chain, such gears make up a speed-reducer that reduces the rotation rate of high-speed DC motor to an adequate driving speed of transmission chain, on which a plurality of brackets for discs are installed.

5. The disc storage case according to claim 1, wherein a safety protective mechanism of the transmission comprises a belt, speed-reducer and chain belt, the belt as first-stage belt has the duty of vibration resistance, noise elimination and overload protection.

6. The disc storage case according to claim 1 wherein the number of a plurality of brackets for the discs is at least 12 to 60 for holding 24 to 120 discs.

7. The disc storage case according to claim 1, wherein each of the brackets having arc-shaped grooves are suitable for holding CD, VCD and CD-ROM, and are also suitable for holding DVD by modifying slightly the width of the arc-shaped grooves, and are further suitable for holding MD and floppy discs by making the arc-shaped grooves changed into rectangular ones.

8. The disc storage case according to claim 1, wherein the outer socket for connecting DC power supply at the back of the storage case can be connected with a low-voltage output plug of an AC-DC adaptor so as to replace the cells' power by using AC power supply of the electric net.

9. The disc storage cases, comprising a plurality of disc storage cases as claimed in claim 1, and a plurality of fixing accessories, by which a plurality of such cases can be piled up and fixed.

10. A disc storage case which can move a target disc to its front opening by operating power-driven buttons thereon or inputting serial number by LCD to proceed automatic search, comprising an outer casing, a chassis, a rolling top, two drawers, a face plate, two button switches located on both left and right sides of the front face plate, two lamps on the back of the face plate, an outer socket for connecting DC power supply at back of the storage case and an electric cell chamber under the chassis, a power-driven selective conveyor located on the chassis which comprises a plurality of disc brackets, each having two arc-shaped grooves for holding vertically two discs back-to-back so the contents printed on the disc can be read easily.

11. The disc storage case of claim 10 wherein the chassis further comprises:

a contact main switch, causing the lamps to light and illuminate the discs on the brackets in the front opening of the storage case;

a micro high-speed DC motor, which can rotate towards one direction to make the bracket of the disc move clockwise when the left button switch is pressed and can rotate towards another direction to make the bracket of the disc move counterclockwise when the right button switch is pressed;

a transmission with safety protective mechanism driven by the micro high-speed DC motor to have the bracket of the disc moved while any one of the two button switches is pressed continuously, and it will stop by releasing the button switch when the disc needed is forwarded to the front position.

* * * * *